(12) United States Patent
Levac et al.

(10) Patent No.: US 11,126,417 B2
(45) Date of Patent: *Sep. 21, 2021

(54) SYSTEM AND METHOD FOR APPLICATION PLUG-IN DISTRIBUTION

(71) Applicant: Barracuda Networks, Inc., Campbell, CA (US)

(72) Inventors: Mathew Levac, Ottawa (CA); Fleming Shi, Scotts Valley, CA (US)

(73) Assignee: Barracuda Networks, Inc., Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/947,075

(22) Filed: Jul. 17, 2020

(65) Prior Publication Data

US 2020/0348920 A1     Nov. 5, 2020

Related U.S. Application Data

(63) Continuation of application No. 16/370,780, filed on Mar. 29, 2019, now Pat. No. 10,761,825.

(Continued)

(51) Int. Cl.
| | |
|---|---|
| *G06F 8/61* | (2018.01) |
| *G06F 8/71* | (2018.01) |
| *G06F 21/53* | (2013.01) |
| *G06F 11/30* | (2006.01) |
| *G06F 11/34* | (2006.01) |

(Continued)

(52) U.S. Cl.
CPC .............. *G06F 8/61* (2013.01); *G06F 8/71* (2013.01); *G06F 11/302* (2013.01); *G06F 11/3495* (2013.01); *G06F 16/2455* (2019.01); *G06F 21/53* (2013.01); *G06F 9/44526* (2013.01); *G06F 2221/033* (2013.01)

(58) Field of Classification Search
USPC ............................................ 717/175
See application file for complete search history.

(56) References Cited

U.S. PATENT DOCUMENTS

| | | | | |
|---|---|---|---|---|
| 7,461,369 B2 * | 12/2008 | Zhao | ................... | G06F 11/3419 714/E11.195 |
| 7,523,191 B1 * | 4/2009 | Thomas | .............. | G06F 11/3438 709/202 |

(Continued)

*Primary Examiner* — Wei Y Zhen
*Assistant Examiner* — Clint Thatcher

(57) ABSTRACT

A new approach is proposed that contemplates systems and methods to support a sandboxed application plug-in distribution framework. An installation package containing a monitoring plug-in, a display plug-in, and/or third part components is received by a first application running on a first computing device. The first application installs the display plug-in and saves the monitoring plug-in to a centralized database. The first application sends an instruction to a second application running on a second computing device to retrieve the monitoring plug-in from the database and install the monitoring plug-in on the second computing device. Upon receiving a user request, the display plug-in of the first application sends a query to the monitor plug-in of the second application. In response to the query, the monitoring plug-in sends the requested monitored data collected by the second application to the display plug-in, which then formats and presents the monitored data to the user.

27 Claims, 5 Drawing Sheets

Related U.S. Application Data

(60) Provisional application No. 62/651,021, filed on Mar. 30, 2018.

(51) Int. Cl.
    *G06F 16/2455*     (2019.01)
    *G06F 9/445*     (2018.01)

(56) References Cited

U.S. PATENT DOCUMENTS

| | | | | |
|---|---|---|---|---|
| 8,997,092 | B2 * | 3/2015 | Gentile | H04L 67/025 |
| | | | | 717/177 |
| 10,438,120 | B2 * | 10/2019 | Simm | H04L 67/143 |
| 2005/0138150 | A1 * | 6/2005 | Bhasker | G06F 8/71 |
| | | | | 709/220 |
| 2008/0228910 | A1 * | 9/2008 | Petri | G06F 11/3438 |
| | | | | 709/224 |
| 2008/0307088 | A1 * | 12/2008 | Chen | G06F 11/3495 |
| | | | | 709/224 |
| 2011/0173251 | A1 * | 7/2011 | Sandhu | G06F 21/53 |
| | | | | 709/203 |
| 2013/0117849 | A1 * | 5/2013 | Golshan | G06F 21/566 |
| | | | | 726/23 |
| 2013/0305216 | A1 * | 11/2013 | Alabiso | G06F 8/31 |
| | | | | 717/106 |
| 2014/0007214 | A1 * | 1/2014 | Qureshi | G06F 21/53 |
| | | | | 726/12 |
| 2017/0206034 | A1 * | 7/2017 | Fetik | G06F 21/78 |
| 2018/0322136 | A1 * | 11/2018 | Carpentier | G06F 9/452 |
| 2019/0079780 | A1 * | 3/2019 | Coven | G06F 9/44526 |
| 2019/0347420 | A1 * | 11/2019 | Schultz | G06F 21/57 |

\* cited by examiner

US 11,126,417 B2

SYSTEM AND METHOD FOR APPLICATION PLUG-IN DISTRIBUTION

CROSS-REFERENCE TO RELATED APPLICATIONS

This application is a continuation of U.S. patent application Ser. No. 16/370,780, filed Mar. 29, 2019, and entitled "System and Method For Application Plug-In Distribution," which claims the benefit of U.S. Provisional Patent Application No. 62/651,021, filed Mar. 30, 2018, and entitled "Sandboxed Plug-in Framework." Both are incorporated herein in their entireties by reference.

BACKGROUND

Application plug-ins (also referred to as plug-ins or extensions) are software components that can be integrated into an application running on a computing device, wherein the application plug-ins provide a convenient way to include additional capabilities to the application or to modify existing capabilities of the application. Installation of an application plug-in to the application, however, may often require an update to the application, or may require a restart of the application or the computing device the application is running on. Additionally, installing an application plug-in may affect the security performance of the application. For a non-limiting example, an application plug-in may be provided by a third party and delivered to the computing device over a network. As a result, the application plug-in may be a malicious due to either a malicious intent by the third party or a cyber attack that compromised the application plug-in with malicious content. Since the application running on the computing device has been trusted by the user, the user may unwittingly assume the plug-in is not malicious and install it with the application, causing security risk to the application and/or the computing device the application is running on. A secure way to distribute application plug-ins is thus desired.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF EMBODIMENTS

Figure 1:
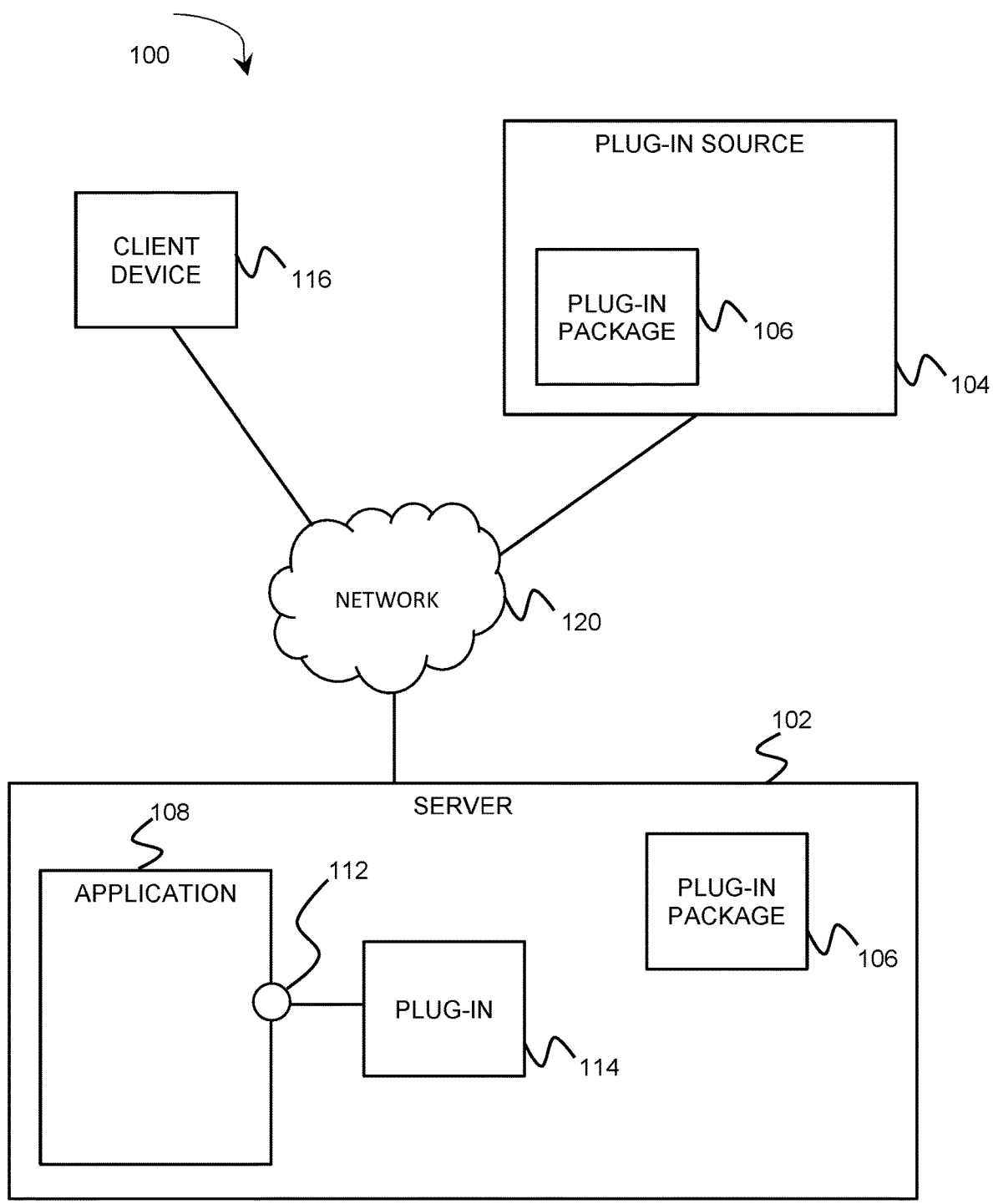
FIG. 1 is a block diagram of an example of an operating environment for a system that supports application plug-ins for distributed applications according to some embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. The approach is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

A new approach is proposed that contemplates systems and methods to support a sandboxed application plug-in framework for distributed applications. First, an installation package containing a monitoring plug-in, a display plug-in, and/or third part components is received by a first application running on a first computing device. The first application installs the display plug-in and saves the monitoring plug-in and other files of the installation package to a centralized database. The first application then sends an instruction/command to a second application running on a second computing device to retrieve the monitoring plug-in from the database and install the monitoring plug-in in the second application running on the second computing device. When a user request is received by the first application, the display plug-in of the first application sends a query to the monitor plug-in of the second application to request monitored data of the second computing device. In response to the query, the monitoring plug-in of the second application sends the requested monitored data collected by the second application to the display plug-in of the first application, which then formats and presents the monitored data to the user.

By distributing and deploying the monitoring plug-in to a remote computing device, the proposed approach supports remote monitoring management (RMM) of the remote computing device. Here, the monitoring plug-in can be delivered from the cloud as part of the installation package, extracted and installed on the remote computing device at runtime. As such, the monitoring plug-in can be deployed dynamically over a network to any client device/endpoint to be monitored remotely for security and other purposes. Compared to manual installation of monitoring agents, such an approach ensures that the monitoring plug-in is always secure, up-to-date, and can be selectively deployed to any remote computing device needs to be monitored at any time.

FIG. 1 depicts an example of a system diagram 100 of an operating environment for a system that supports application plug-ins for distributed applications. Although the diagrams depict components as functionally separate, such depiction is merely for illustrative purposes. It will be apparent that the components portrayed in this figure can be arbitrarily combined or divided into separate software, firmware, and/or hardware components. Furthermore, it will also be apparent that such components, regardless of how they are combined or divided, can execute on the same host or multiple hosts, and wherein the multiple hosts can be connected by one or more networks.

In the example of FIG. 1, the system 100 includes a server 102, a plug-in source computer 104 and a client device 116 communicably coupled to the server 102 and/or the plug-in source server 104 via a network 120. Each of the servers and/or devices is a host, which includes one or more processors with software instructions stored in a storage unit such as a non-volatile memory (also referred to as secondary memory) of the host for practicing one or more processes. When the software instructions are executed by the one or more processors of the host, at least a subset of the software instructions is loaded into a memory unit (also referred to as primary memory) by the host, which becomes a special purposed one for practicing the processes. The processes may also be at least partially embodied in the host into which computer program code is loaded and/or executed, such that, the host becomes a special purpose computing unit for practicing the processes. When implemented on a general-purpose computing unit, the computer program code segments configure the computing unit to create specific logic circuits. In some embodiments, each host can be a computing device, a communication device, a storage device, or any computing device capable of running a software component. For non-limiting examples, a computing device can be but is not limited to a server computer, a laptop computer, a desktop computer, a tablet, a Google Android device, an iPhone, an iPad, a set-top box, a video game console, an Internet of Things (IoT) device, and a voice-controlled speaker or controller. Each host has a communication interface (not shown), which enables the engines to communicate with each other, the user, and other devices over one or more communication networks following certain communication protocols, such as TCP/IP, http, https, ftp, and sftp protocols. Here, the communication networks can be but are not limited to, internet, intranet, wide area network (WAN), local area network (LAN), wireless network, Bluetooth, WiFi, mobile communication network, corporate network, enterprise network, campus network etc. The physical connections of the network and the communication protocols are well known to those of skill in the art.

In the example of FIG. 1, the server 102 is configured to host a main application 108 configured to interface with an application plug-in (or plug-in) 114 installed using a plug-in/installation package 106 as described in detail below. Here, the main application 108 can be any type of application or service that controls and interacts with one or more application plug-ins (e.g., plug-in 114) via an interface 112. The plug-in 114 is a software component that can also be referred to as an extension. The plug-in 114 can be an application, an applet, or other program that, once installed, adds functionality, extends existing functionality, or modifies functionality provided by the main application 108 or another application running on the client device 116. For non-limiting examples, the plug-in 114 can be implemented for virtualized machine software, backup software, antivirus software and office productivity software such as email, word processing etc. Although the main application 108 and the plug-in 114 as described above as executing on the server 102, it should be noted that the embodiments are not so limited. In alternative embodiments, the main application 108 and the plug-in 114 can execute on any type of computing device, including desktop computers, laptop computers, tablet computers, smart phones etc.

In some embodiments, the interface 112 between the main application 108 and the plug-in 114 can be provided via a service that the plug-in 114 implements, wherein the plug-in 114 is provided with a service contract that contains a method (e.g., a "get page" method), which provides a response to a request when the method invoked. As such, the interface 112 is basically an Application Programming Interface (API) that the plug-in 114 implements. For a non-limiting example, in some embodiments, Windows Communication Framework (WCF), which is part of C #.NET, is used as the service contract to implement the interface 112, wherein the WCF provides a way to host a service in a process and send messages to and from the service via a separate process. Although WCF is used here as a non-limiting example, those of ordinary skill in the art will appreciate that many other programming languages besides C #.NET also offer similar frameworks for inter-process communication and are within the scope of the inventive subject matter.

In the example of FIG. 1, the plug-in source server 104 is configured to package one or more plug-ins into the form of the plug-in package 106 and provide the plug-in package 106 to the server 102, which is configured to accept the plug-in package 106 from the plug-in source server 104 for use by the main application 108 as well as other applications. Here, the plug-in source server 104 can be managed by a plug-in developer and/or provides a library of plug-ins available for download. In some embodiments, the plug-in source server 104 is configured to compress the plug-in package 106 into a smaller package, e.g., a single ".zip" file, to make distribution of the plug-in package 106 over the network 120 easier and/or more efficient.

Figure 2:
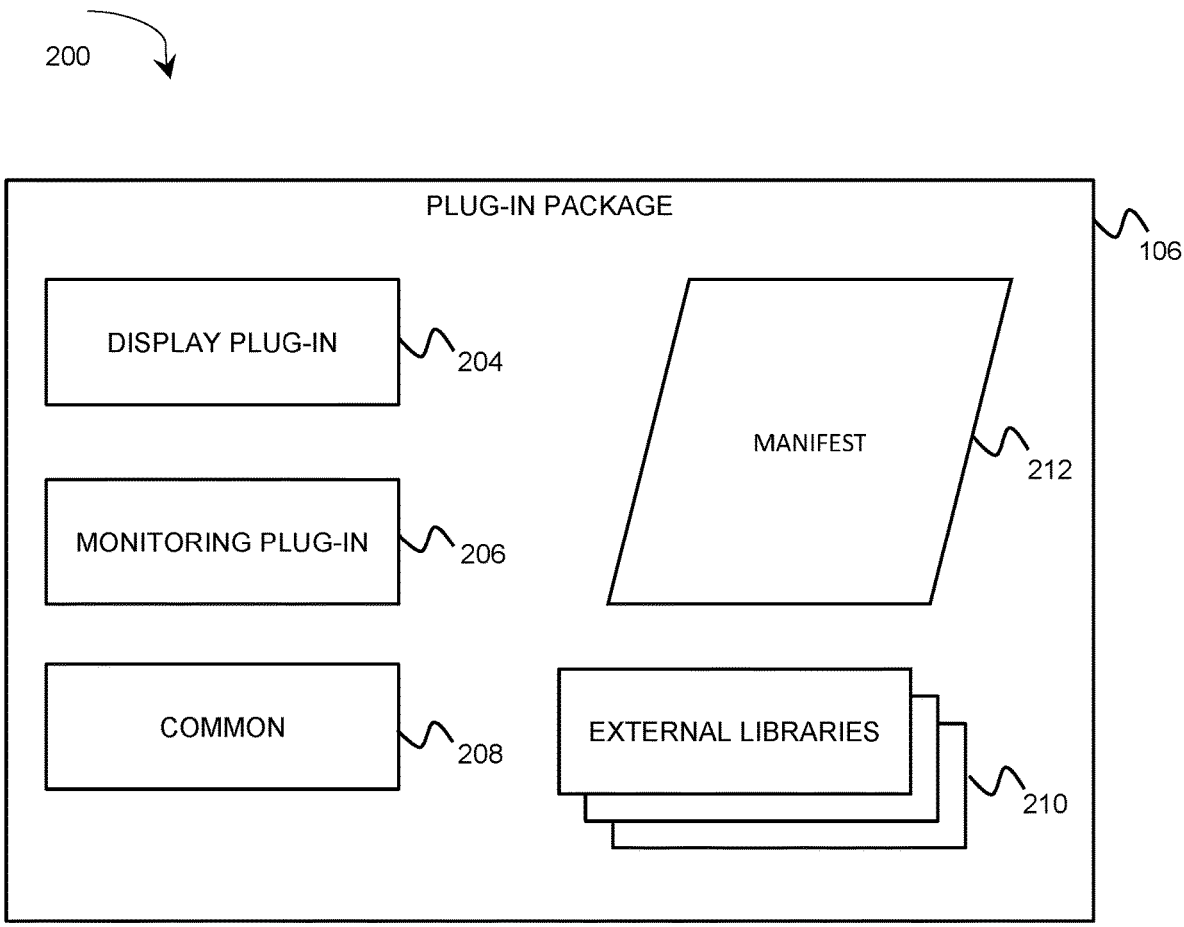
FIG. 2 is a block diagram illustrating an example of a structure of a plug-in package according to some embodiments.

FIG. 2 is a block diagram illustrating an example of a structure of the plug-in package 106. As shown by the example of FIG. 2, the plug-in package 106 may include one or more of a display plug-in 204, and a monitoring plug-in 206, and a manifest 212. Here, the manifest 212 contains a description of contents of the plug-in package 106. In some embodiments, the manifest 212 can be in an XML (eXtensible Markup Language) format. In some embodiments, the plug-in package 106 may optionally include a common component 208 and/or one or more external libraries 210. The common component 208, when present, can be an assembly of code and data to be shared by the display plug-in 204 and the monitoring plug-in 206. Each external library 210, when present, can be a third party assembly of code and data to be referenced by any of the display plug-in 204, monitoring plug-in 206, and/or the common component 208.

In the example of FIG. 2, the display plug-in 204 can be an assembly of code and data that generates one or more customized (web) pages to be displayed within the main application 108 to a user, wherein the customized pages can provide additional display functionalities to the main application 108 or can extend currently existing display functionalities provided by the main application 108. The display plug-in 204 is deployed to the server 102 and installed/implemented/integrated with the main application 108.

In the example of FIG. 2, the monitoring plug-in 206 can be an assembly of code and data that collects data from the main application 108 and/or the server 102 the main application 108 runs on. For a non-limiting example, the data collected by the monitoring plug-in 206 includes but is not limited to security risk to the main application 108 and/or the server 102. In some embodiments, the data collected by the monitoring plug-in 206 can be used to populate, e.g., tables and charts, of the customized pages generated by the display plug-in 204. In some embodiments, instead of being installed in the main application 108 running on the server 102, the monitoring plug-in 206 can be deployed to the client device 116, wherein the data collected by the monitoring plug-in 206 on the client device 116 can be provided to the main application 108 on the server 102. Once received by the main application 108 on the server 102, the data collected and sent by the monitoring plug-in 206 on the client device 116 can be queried upon a user request and presented to the user via the display plug-in 204.

Figure 3:
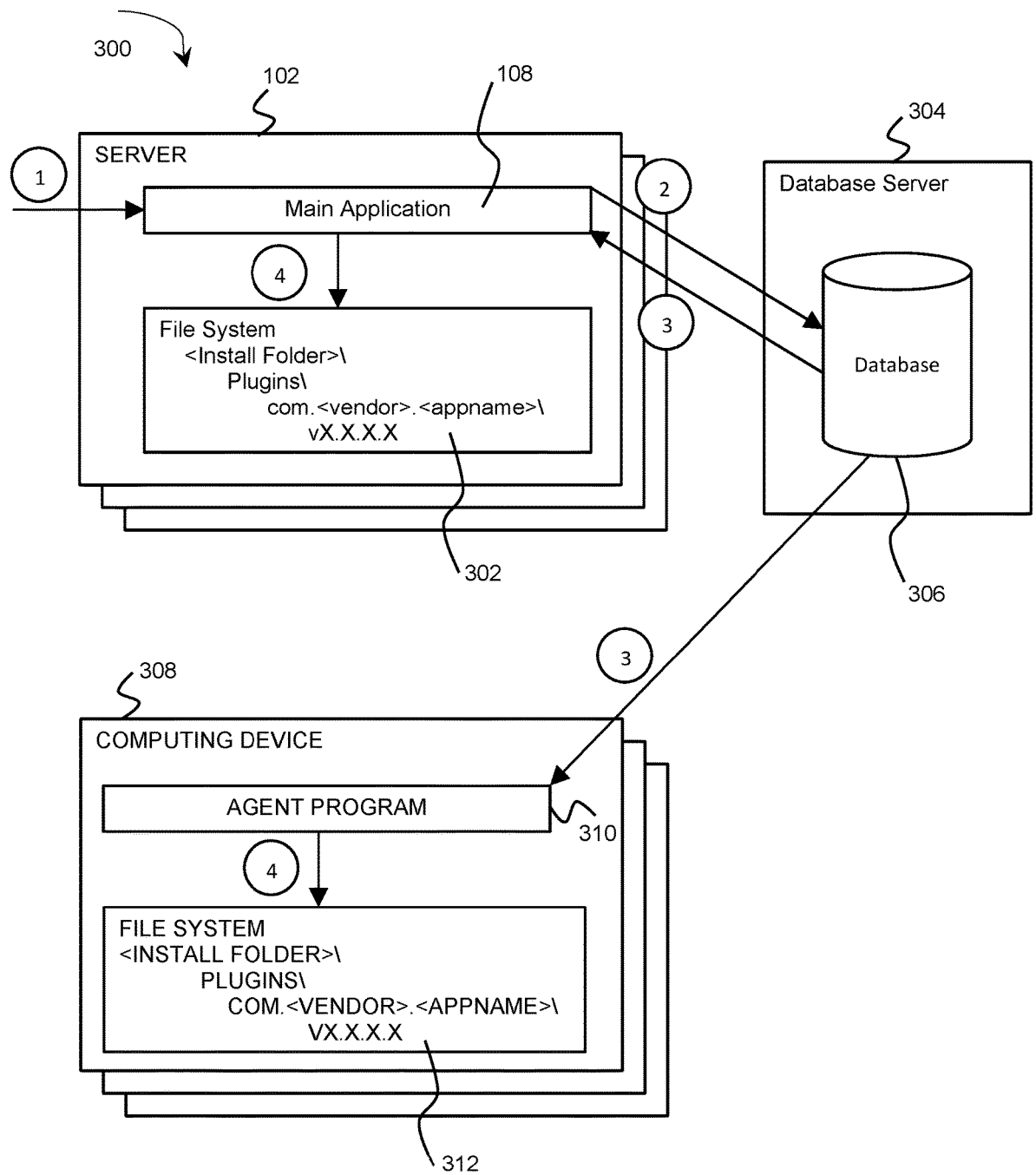
FIG. 3 is a block diagram illustrating an example of an operating environment for a system that supports distribution of application plug-ins among various devices over a network according to some embodiments.

FIG. 3 is a block diagram illustrating an example of an operating environment for a system that supports distribution of application plug-ins among various devices over a network. As indicated by circled numbers in FIG. 3, the main application 108 running on the server 102 is configured to conduct an initial installation of the plug-in 114 in multiple stages. At stage #1, the main application 108 receives the plug-in package 106 and extracts various types of package files discussed above from the plug-in package 106. In some embodiments, the main application 108 utilizes the manifest file 212 extracted from the plug-in package 106 to assist in navigating the contents of the plug-in package 106. At stage #2, the individual files extracted from the plug-in package are saved to a centralized database 306 running on a database server 304 so that the files can be made available to one or more agent programs/distributed applications 310 running on a computing device 308. At stage #3, the main application 108 is configured to retrieve the display plug-in 204, the monitoring plug-in 206, the common component 208 and/or the external libraries 210 from the centralized database 304. At stage #4, the components retrieved from the centralized database 304 are copied to the local file system 302 in a folder structure and are loaded into memory of the server 102 for execution.

In some embodiments, the main application 108 is configured to defer loading of the components retrieved from the centralized database 304 into the file system 302. For a non-limiting example, when a first request is made by a user to view a custom page, the main application 108 can ensure that the appropriate the display plug-in 204 and necessary references have been retrieved from the centralized database 306 and placed into the file system 302 of the server 102 that is handling the request by the user so that the display plug-in 204 and necessary references can be loaded into memory of the server 102 and executed by the main application 108.

In some embodiments, the main application 108 can be a distributed application where functionalities of the main application 108 can be distributed across multiple servers 102 and/or computing devices 308, e.g., the client device 116 shown in FIG. 1. Here, the computing device 308 can be any type of device having a processor, memory and network interface to communicably couple the computing device 308 to a network (e.g., network 120 of FIG. 1). For non-limiting examples, the computing device 308 can be but is not limited to a desktop computer, a server computer, a laptop computer, a tablet computer, a smart phone, a set-top box, a video game console, an Internet of Things (IoT) device, and a voice-controlled speaker or controller. In some embodiments, the computing device 308 is located remotely from the server 102 and accessible over a network (e.g., network 120). In some embodiments, an agent program 310 can execute on the computing device 308 to collect/monitor data from the computing device 308, wherein the data collected include data on the operating environment, the applications and/or security environment of the computing device 308. In some embodiments, the agent program 310 can be part of the distributed application having functionalities distributed from the main application 108. In such embodiments, the main application 108 is configured to create/issue and send a command to the agent programs 310 of the distributed application to instruct the agent programs 310 to retrieve the monitoring plug-in 206 from the centralized database 306. Upon receiving such command, the agent program 310 is configured to process the command and to retrieve the monitoring plug-in 206 and its necessary references (i.e., references to common components 208 and/or external libraries 210) from the centralized database 306 as part of stage #3. The agent program 310 is further configured to copy the retrieved monitoring plug-in 206 and its necessary references to a local file system/file folder 312 on the computing device 308 as part of stage #4, and load/install the monitoring plug-in 206 and its necessary references into memory of the computing device 308 for execution by the agent program 310.

In some embodiments, the monitoring plug-in 206 running on the computing device 308 is configured to implement a polling method, e.g. as part of an API, wherein the polling method is called periodically by the main application 108 running on the server 102 to obtain monitoring data collected by the agent program 310. In response to the polling, the monitoring plug-in 206 is configured to send the data collected by the agent program 310 to the main application 108 for consumption by the display plug-in 204 running on the server 102.

In some embodiments, the display plug-in 204 running on the server 102 is configured to implement an interface, e.g., an API, which contains a "get page" method that can be invoked by the main application 108 in response to a user's action/request, e.g., by clicking on or otherwise selecting a user interface element, to cause the display plug-in 204 to be invoked by the main application 108 to display content, e.g., monitoring data collected by the monitoring plug-in 206 to the user.

As shown by the example of FIG. 3, files on the servers 102 and/or computing devices 308 can be placed into various vendor and/or plug-in specific folder structures 302 and 312, respectively. In some embodiments, as shown in FIG. 3, the files in the folder structures 302 and 312 can be versioned so that multiple plug-in versions can be supported at one time. This is desirable for implementations of the plug-in applications in a cloud environment, wherein version 1 of a plug-in application can be executed on a first server/computing device, e.g., server 102, and version 2 of the same plug-in application can be executed on a second server/computing device, e.g., computing device 308.

Figure 4:
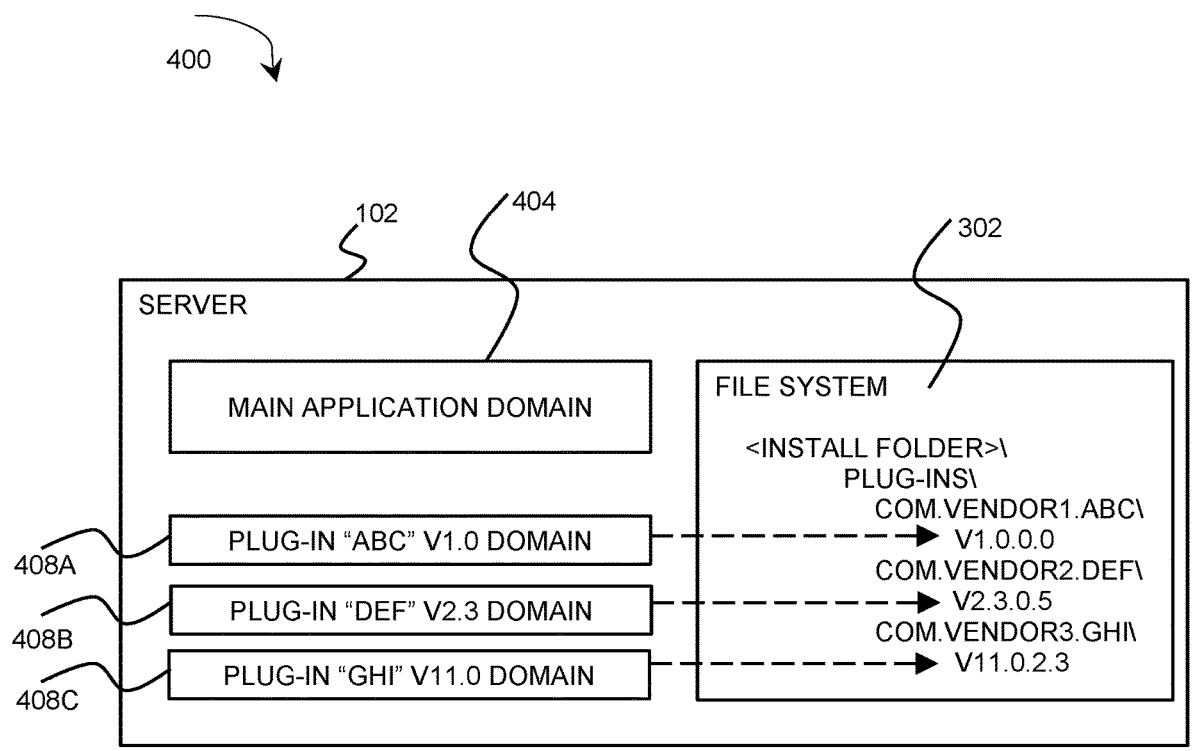
FIG. 4 is a block diagram illustrating an example of application domain sandboxing for application plug-ins according to some embodiments.

FIG. 4 is a block diagram illustrating an example of application domain sandboxing for application plug-ins 114, wherein the folder structures 302 and 312 described above are utilized to create isolation between the plug-ins 114 and the main application 108. In some embodiments, each application plug-in is loaded into a separate plug-in domain 408, e.g., 408A, 408B, and 408C, which is similar to a process and runs within the context of the associated folder structure 302. In implementations using, e.g., C #.NET, the plug-in domains 408 can be application domains that isolate applications from one another. In alternative implementations, a plug-in 114 can be implemented as a process, thus the plug-in domains 408 would be the process domain. Further, in addition to being separate from other plug-in domains, a plug-in domain 408 is also separate from the main application domain 404 where the main application 108 is running. In some embodiments, each plug-in domain 408 is restricted to loading only the runtime assemblies that are present within its folder in the folder structure 302. In the non-limiting example illustrated in FIG. 4, the plug-in "ABC" has a plug-in domain 408A that is restricted to loading code, data, and files within the folder in the folder structure 302 having a path that matches its root or base directory (as provided by the runtime or operating system). In some embodiments, the restrictions can be implemented using access control list functionality provided by the host operating system of the server 102. In some embodiments, the user identifier that the plug-in domain 408 executes can be granted read-only permission to its folder in the folder structure 302, where the assemblies are located, e.g., "<Install Folder>\PLUGINS\COM.VENDOR1.ABC\V1.0.0." for the plug-in domain 408A. In some embodiments, the plug-in domain 408 has a minimal set of permissions which allow the corresponding plug-in 114 to interact with an API exposed by the main application 108. In some embodiments, the permissions are read and execute and are enforced based on a user account that is associated with the specific plug-in 114.

Figure 5:
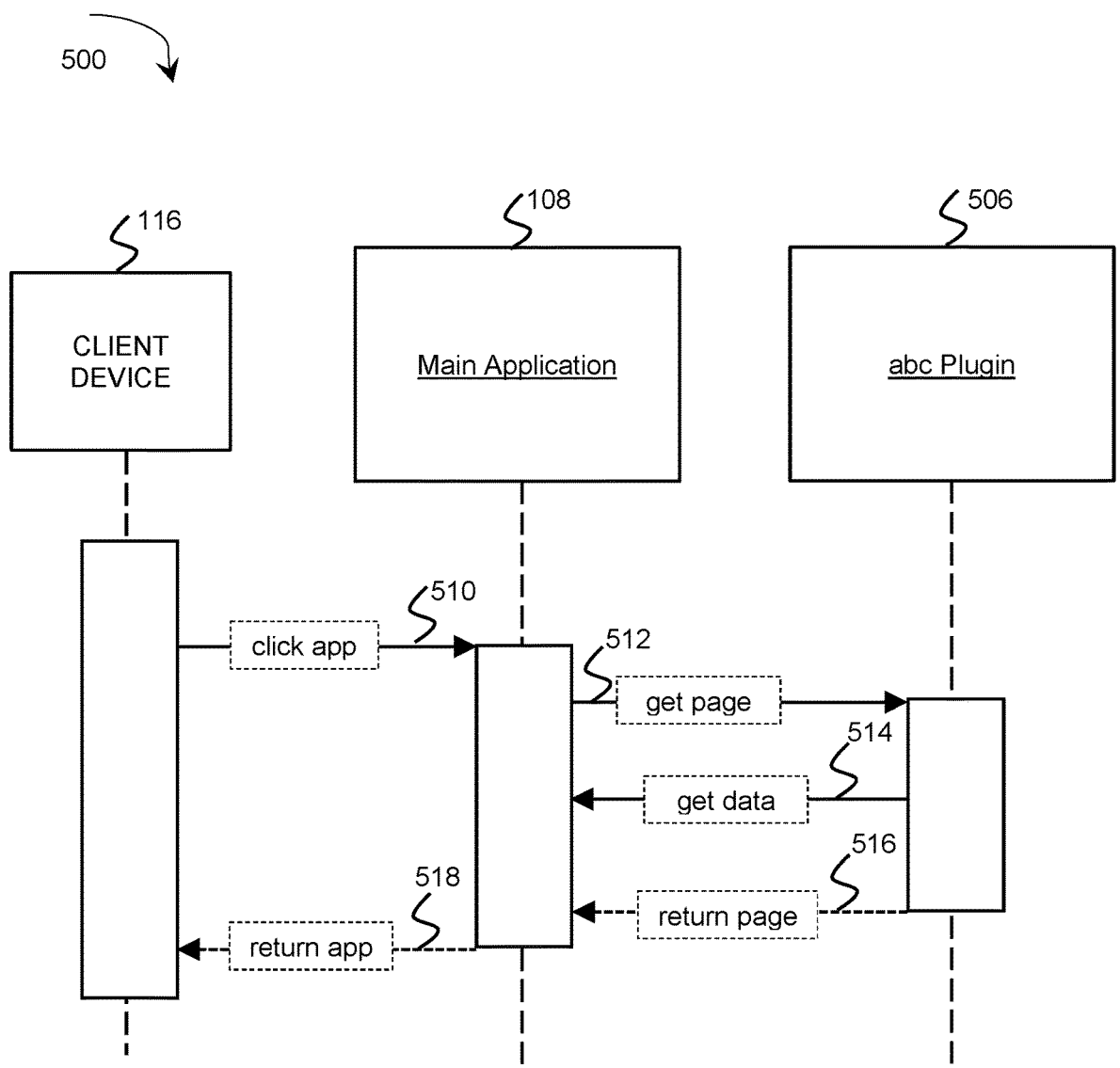
FIG. 5 is a sequence diagram illustrating an example of operations for an application plug-in to serve a user request according to some embodiments.

FIG. 5 is a sequence diagram illustrating an example of operations for an application plug-in to serve a user request. Although the figure depicts functional steps in a particular order for purposes of illustration, the processes are not limited to any particular order or arrangement of steps. One skilled in the relevant art will appreciate that the various steps portrayed in this figure could be omitted, rearranged, combined and/or adapted in various ways.

In the example of FIG. 5, a user at a client device 116 clicks on a user interface element for a plug-in application 506 at step 510. The main application 108 initiates a "get page" request to the plug-in application 506 at step 512. At step 514, the plug-in application 506 invokes an API (e.g., "gate data") in the main application 108 running on the server 102 to retrieve the custom data collected by, e.g., the monitoring plug-in 206 running on the same or a different computing device. At step 516, the plug-in application 506 is configured to use the retrieved data to populate data tables and charts within a given page and provides the page to the main application 108. The main application 108 then returns the page in response to the user at operation 518. In some embodiments, the API being invoked may limit the amount of data returned to the plug-in application 506 to ensure that requests are fulfilled in a reasonable amount of time and do not create CPU or memory pressure on the server 102.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

The methods and system described herein may be at least partially embodied in the form of computer-implemented processes and apparatus for practicing those processes. The disclosed methods may also be at least partially embodied in the form of tangible, non-transitory machine readable storage media encoded with computer program code. The media may include, for a non-limiting example, RAMs, ROMs, CD-ROMs, DVD-ROMs, BD-ROMs, hard disk drives, flash memories, or any other non-transitory machine-readable storage medium, wherein, when the computer program code is loaded into and executed by a computer, the computer becomes an apparatus for practicing the method. The methods may also be at least partially embodied in the form of a computer into which computer program code is loaded and/or executed, such that, the computer becomes a special purpose computer for practicing the methods. When implemented on a general-purpose processor, the computer program code segments configure the processor to create specific logic circuits. The methods may alternatively be at least partially embodied in a digital signal processor formed of application specific integrated circuits for performing the methods.

What is claimed is:

1. A system to support application plug-in distribution, comprising:
   a first computing device comprising a processor and running a first application configured to
      accept a user request to monitor data on a second computing device;
      provide a command to the second computing device to retrieve a monitoring plug-in from a centralized database, wherein the monitoring plug-in is configured to collect and monitor data on the second computing device;
      accept the data monitored and collected by the monitoring plug-in on the second computing device;
      generate and present one or more pages of the monitored data to a user via a display plug-in;
   said second computing device comprising a processor and running a second application configured to
      retrieve and install the monitoring plug-in from the centralized database upon receiving the command from the first computing device if the monitoring plug-in has not been installed on the second computing device;
      monitor and collect data on the second computing device via the monitoring plug-in;
      transmit the monitored data collected by the monitoring plug-in to the first application.

2. A system to support application plug-in distribution, comprising:
   a first computing device comprising a processor and running a first application configured to
      accept a user request to monitor data on a second computing device;
      transmit a monitoring plug-in to the second computing device, wherein the monitoring plug-in is configured to collect and monitor data on the second computing device;
      accept the data monitored and collected by the monitoring plug-in on the second computing device;
      generate and present one or more pages of the monitored data to a user via a display plug-in;
   said second computing device running a second application configured to
      accept and install the monitoring plug-in on the second computing device if the monitoring plug-in has not been installed on the second computing device;
      monitor and collect data on the second computing device via the monitoring plug-in;
      transmit the monitored data collected by the monitoring plug-in to the first application.

3. The system of claim 1, wherein:
the second computing device is located remotely from the first computing device and accessible over a network.

4. The system of claim 1, wherein:
the first computing device is configured to upload the monitoring plug-in to the centralized database.

5. The system of claim 1, wherein:

the monitoring plug-in is deployed dynamically from the centralized database to the second computing device at runtime.

6. The system of claim 1, wherein:
the first computing device is configured to populate and/or customize the one or more pages generated by the display plug-in with the monitored data collected by the monitoring plug-in.

7. The system of claim 1, wherein:
the first computing device is configured to accept the monitoring plug-in and/or the display plug-in in a form of a plug-in package from a plug-in source configured to package one or more plug-ins into the plug-in package and provide the plug-in package to the first computing device.

8. The system of claim 7, wherein:
the plug-in package further includes one or more of a manifest containing a description of contents of the plug-in package, a common component to be shared by the display plug-in and the monitoring plug-in, one or more external libraries to be referenced by any of the display plug-in, monitoring plug-in, and the common component.

9. The system of claim 7, wherein:
the first computing device is configured to upload the plug-in package to the centralized database and the second computing device is configured to download the plug-in package upon receiving the command from the first computing device.

10. The system of claim 1, wherein:
the second computing device is configured to implement a polling interface, wherein the polling interface is called periodically by the first application running on the first computing device to obtain the monitored data collected by the monitoring plug-in.

11. The system of claim 1, wherein:
the second computing device is configured to sandbox and isolate the monitoring plug-in from the second application running on the second computing device.

12. The system of claim 11, wherein:
the second computing device is configured to extract and install the monitoring plug-into a local folder structure for execution on the second computing device.

13. The system of claim 12, wherein:
the second computing device is configured to utilize the local folder structure to create isolation between the monitoring plug-in and the second application running on the second computing device, wherein the monitoring plug-in is loaded into a separate plug-in domain and runs within the context of the associated folder structure to sandbox the plug-ins.

14. The system of claim 13, wherein:
the second computing device is configured to restrict the plug-in domain to load only runtime assemblies that are present within its folder in the local folder structure.

15. A method to support application plug-in distribution, comprising:
accepting a user request for monitored data on a second computing device;
providing a command to the second computing device to retrieve a monitoring plug-in from a centralized database, wherein the monitoring plug-in is configured to collect and monitor data on the second computing device;
retrieving and installing the monitoring plug-in from the centralized database upon receiving the command from a first application if the monitoring plug-in has not been installed on the second computing device;
monitoring and collecting data on the second computing device via the monitoring plug-in;
transmitting the monitored data collected by the monitoring plug-in to the first application;
accepting at a first computing device the monitored data from the monitoring plug-in on the second computing device;
generating and presenting one or more pages of the monitored data to a user via a display plug-in.

16. A method to support application plug-in distribution, comprising:
accepting a user request for monitored data on a second computing device;
transmitting a monitoring plug-in to the second computing device, wherein the monitoring plug-in is configured to collect and monitor data on the second computing device;
accepting and installing the monitoring plug-in on the second computing device if the monitoring plug-in has not been installed on the second computing device;
monitoring and collecting data on the second computing device via the monitoring plug-in;
transmitting the monitored data collected by the monitoring plug-in to a first application;
accepting at a first computing device the monitored data from the monitoring plug-in on the second computing device;
generating and presenting one or more pages of the monitored data to a user via a display plug-in.

17. The method of claim 15, wherein:
the second computing device is located remotely from the first computing device and accessible over a network.

18. The method of claim 15, further comprising:
uploading the monitoring plug-in to the centralized database.

19. The method of claim 15, further comprising:
deploying the monitoring plug-in dynamically from the centralized database to the second computing device at runtime.

20. The method of claim 15, further comprising:
populating and/or customizing the one or more pages generated by the display plug-in with the monitored data collected by the monitoring plug-in.

21. The method of claim 15, further comprising:
accepting the monitoring plug-in and/or the display plug-in in a form of a plug-in package from a plug-in source configured to package one or more plug-ins into the plug-in package and provide the plug-in package to the first computing device.

22. The method of claim 21, further comprising:
uploading the plug-in package from the first computing device to the centralized database;
downloading the plug-in package to the second computing device upon receiving the command from the first computing device.

23. The method of claim 15, further comprising:
implementing a polling interface via the second computing device, wherein the polling interface is called periodically by the first application running on the first computing device to obtain the monitored data collected by the monitoring plug-in.

24. The method of claim 15, further comprising:
sandbox and isolate the monitoring plug-in from a second application running on the second computing device.

25. The method of claim 24, further comprising:

extracting and installing the monitoring plug-into a local folder structure for execution on the second computing device.

26. The method of claim 25, further comprising:
utilizing the local folder structure to create isolation between the monitoring plug-in and the second application running on the second computing device, wherein the monitoring plug-in is loaded into a separate plug-in domain and runs within the context of the associated folder structure to sandbox the plug-ins.

27. The method of claim 26, further comprising:
restricting each plug-in domain to load only runtime assemblies that are present within its folder in the local folder structure.

* * * * *